Aug. 15, 1961 C. W. BARNES, JR 2,996,573

TELEVISION PROJECTION SYSTEM EMPLOYING ELECTROSTATIC PRINTING

Filed May 13, 1957

INVENTOR.
CASPER W. BARNES, JR.
BY Lyon & Lyon
ATTORNEYS

United States Patent Office 2,996,573
Patented Aug. 15, 1961

2,996,573

TELEVISION PROJECTION SYSTEM EMPLOYING ELECTROSTATIC PRINTING

Casper W. Barnes, Jr., Palo Alto, Calif., assignor to A. B. Dick Company

Filed May 13, 1957, Ser. No. 658,681
3 Claims. (Cl. 178—5.4)

This invention relates to projection systems and, more particularly, to an improved system for projecting video signals.

A number of different video-signal projection systems have been proposed and used. Some of these include either high-lumen-output cathode-ray tubes with lens systems for projecting the light from the phosphor of these tubes onto a screen, or systems using sonic cells for modulating the light from a projection arc.

An object of the present invention is the provision of a novel video-signal projection system employing electrostatic printing techniques.

Yet another object of the present invention is the provision of a useful and inexpensive video-signal projection system.

Still a further object of the present invention is the provision of a video-signal projection system using electrostatic printing techniques which are suitable for projecting pictures in either color or black and white.

These and other objects of the invention are achieved by providing a system wherein signals from a source of video signals and deflection signals are applied to an electrostatic printing tube. This tube is of the type wherein electrons are formed into a beam, which is modulated by the video signals and swept across the target in response to deflection signals from the deflection-signal source. The target comprises a plurality of spaced wires insulated from each other which extend from inside the tube to the external face thereof, forming a column of wire points. Spaced opposite the column of wire points is a ground plane. A transparent dielectric writing medium is continuously moved between the ground plane and the column of wire points to have deposited thereon from these points electrostatic charges which are arranged in a pattern responsive to the video and sweep signals. The transparent dielectric writing medium is then passed by an electrostatic developing position wherein powder is made to adhere to the charged regions and does not adhere to the non-charged regions of the medium. Thereby, the electrostatic charge pattern is rendered visible.

The writing medium is next passed by an illuminating position, which illuminates the medium for the purpose of projecting the image which has been developed upon a screen. After the illuminating position, the writing medium is next passed by a station at which the powder is removed from the dielectric medium, either by discharging the dielectric medium or by magnetically attracting the powder away from the medium, or both, plus scrubbing with a brush. The medium may then again be passed in front of the electrostatic printing tube to again have printed thereon a new electrostatic charge pattern.

For the purpose of color projection, three of these systems may be employed to simultaneously print pictures representative of separation color positives. At the illuminating position, three color filters are provided, corresponding to the primary colors, represented by the picture components. The outputs at the illuminating position are superimposed and projected upon a screen to provide a color picture. This process is used when the three tubes are made to write in the three additive primary colors. If the three tubes are made to write in the three subtractive primary colors, then the three films may be first superimposed and then projected simultaneously, using a single projector.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Electrostatic printing is well known and has been discussed in the literature. The principles are quite simple. First, a charge is deposited on paper or other dielectric material in a predetermined pattern and then this pattern is made visible by dusting the paper with a dielectric powder whose grains carry charges of the opposite sign. The powder will cling to the charged areas and not to the uncharged ones, making the latent charge image visible. The powder can thereafter be permanently fused to the paper by heat, pressure, or other means. If it is desired to remove the powder from the paper, all that is necessary is to discharge the paper or by applying it to a conductive medium, such as a metal plate, the powder which remains can thereafter be brushed off. The present invention makes use of a novel electrostatic printing tube which has been described and claimed in an application which is assigned to a common assignee and entitled Electrostatic Printing System, by John L. Tregay, filed May 10, 1957, Ser. No. 658,275.

Figure 1:
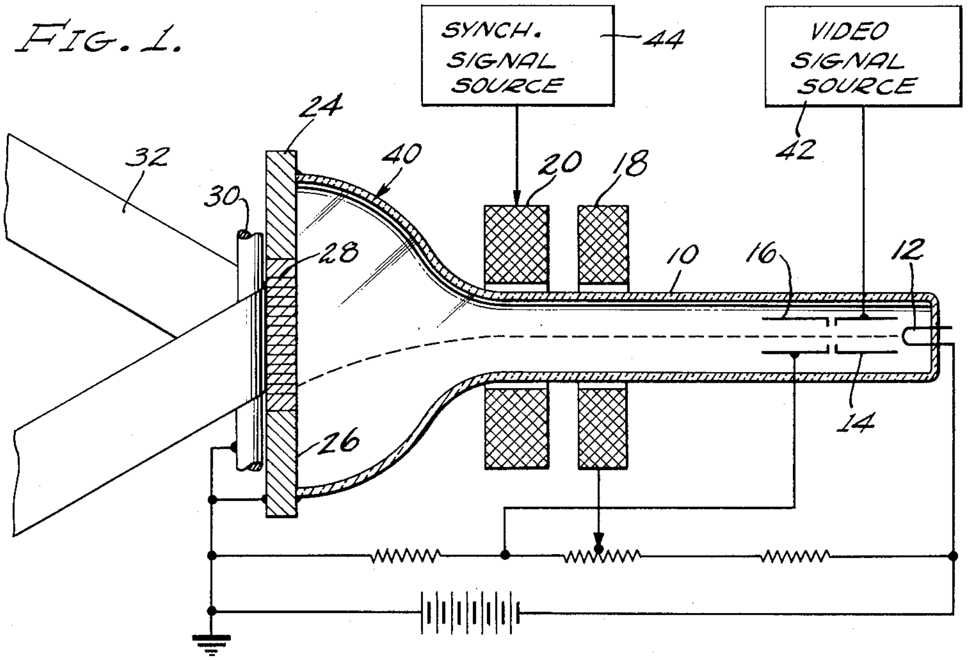
FIGURE 1 is a diagram in cross section of an electrostatic printing tube, the use of which is preferred in the invention.

FIGURE 1 is a cross-sectional view of an electrostatic printing tube of the type preferred for utilization in the embodiment of the invention. This tube includes an envelope 10, having therein a cathode 12, a control grid 14, an accelerating electrode 16, a focus coil 18, and a deflection coil 20. The front end of the tube is enclosed by a target plate 24. As thus far described, the tube is known. The electrons stream from the cathode is controlled in intensity by signals applied to the control grid. The focusing coil focuses these electrons into a beam which is deflected across the target in accordance with deflection signals.

The electrostatic printing tube, however, differs from other cathode-ray tubes in the structure of the target. This includes a metal plate 26, which is sealed to the face of the tube and has in a slot at the center thereof a plurality of writing wires 28, which are separately insulatingly supported and pass from inside the tube to the outside, to present at a writing surface at the outside a column of wire points. These points have positioned opposite to them a ground plane or conductor 30. A dielectric writing medium 32 is moved past these points between the ground plane and these points. The cathode-ray beam is successively passed across the wires as the dielectric medium is moved transversely to the column of points. The potential of any one of the writing wires on which the cathode ray falls will be raised towards the potential of the cathode. At a critical potential value, a discharge will occur between the external end of the writing wire and the dielectric medium which is at ground potential, whereby a spot of charge will be left on the dielectric medium. It will be readily appreciated that by properly modulating the cathode-ray beam with video signals as the beam is swept successively across the wire and by pulling the writing medium at a properly synchronized speed, letters, numbers, symbols, or pictures may be reproduced on the dielectric medium in the form of a charge pattern. This can be subsequently developed, using the well-known electrostatic printing techniques whereby a picture may be presented.

Figure 2:
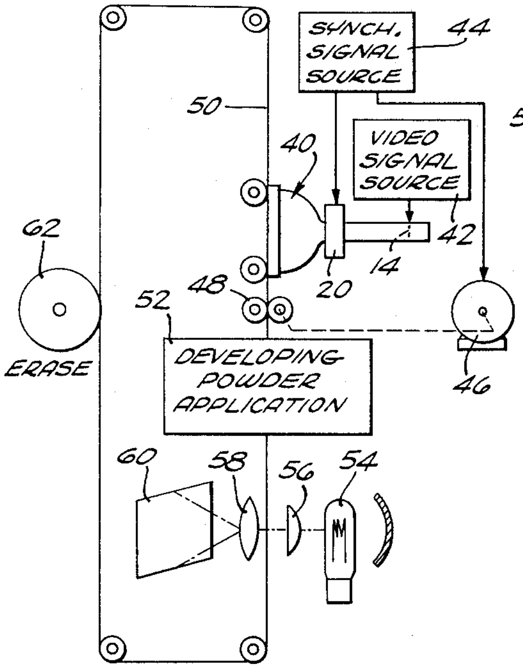
FIGURE 2 is a diagram of an embodiment of the invention.

Reference is now made to FIGURE 2, wherein there is shown an embodiment of the invention. This includes an electrostatic printing tube 40 of the type described in FIGURE 1. To the control grid of this electrostatic printing tube there are applied from a video-signal source 42 video signals for controlling the intensity of the cathode-ray beam generated within the tube. A synchronizing signal source 44 provides the horizontal and vertical deflection signals which accompany the video signals from the video-signal source 42. The horizontal deflection signals are applied to the deflection yoke 20, the vertical synchronizing signals are applied to a motor 46, which drives a pair of rollers 48. These rollers move a dielectric writing medium 50, which is transparent, at a speed synchronized by the vertical synchronizing signals.

The transparent writing medium 50, which can be any one of the well-known plastic tapes, such as "Mylar," is pulled past the face of the electrostatic writing tube 40 to have deposited thereon a charge pattern in the manner described in FIGURE 1. Developing powder is then applied to the transparent tape at a developing station 52, to render the latent electrostatic pattern visible. The tape thereafter is moved through an illuminating station at which a projection lamp 54 has its light focused upon the tape by means of a lens 56, and after the light passes therethrough a second lens 58 focuses the image upon the screen 60. The tape loop thereafter continues to an erasing station 62, which neutralizes the electrostatic charge in well-known manner and collects the developing powder. Thereafter, the tape may continue in the loop, to be used over again.

It should be appreciated that the video-signal source and sync-signal source are representative of signals derived, either from a television system or a radar system, or, indeed, even from facsimile apparatus. By the embodiment of the invention shown, the television or radar pictures may be projected as large as desired, since the source of illumination may be a theater-type projection art.

Figure 3:
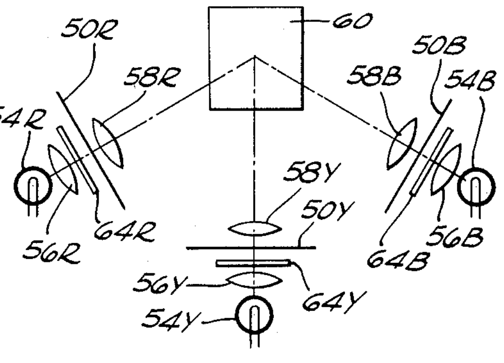
FIGURE 3 shows in fragmentary form an embodiment of the invention used for color-picture projection.

For the purpose of color projection, three of the systems shown in FIGURE 2 may be employed, wherein the three tubes simultaneously write on the three transparent tapes in response to signals representative of the three additive primary colors. The three pictures can then be projected separately and simultaneously on the same screen, using either color-light sources or filters for such projection. A fragmentary diagram of such an arrangement is shown in FIGURE 3. The three tape loops which respectively receive pictures corresponding to color-separation pictures, are shown in fragmentary form. These tape loops are 50R, 50B, and 50Y. Three light sources 54R, 54Y, and 54B provide the required illumination of each picture. The proper lenses 56R, 56Y, and 56B focus the light upon the transparent writing medium through, respectively, a red filter 64, a yellow filter 64Y, and a blue filter 64B. Lenses 58R, 58Y, and 58B superimpose the three images upon the screen 60. Thereby, the color picture represented by the electrostatically printed images is provided. If the light sources 54R, 54Y, and 54B were themselves colored, then there would be no necessity for the three filters.

Another advantage of this system is for applications where "slow-scan" arrangements are required. Many industrial television applications have no need for the fast-scan rate used in commercial television. In many applications, one frame per second, or even one frame every few seconds, is sufficient. If such rates are used with the conventional cathode-ray tubes, the first part of the picture would fade out before the last part is written. The electrostatic writing system described above solves this problem. Each picture is stored in the form of the charge pattern on film until the frame scan is completed. This picture can then be projected while the next frame is being scanned.

Accordingly, there has been described and shown herein a novel, useful, and unique method and means for projecting pictures from video signals and synchronizing signals, either in black and white or in color. It will be appreciated that the tape loop may be replaced by a cylinder and that, if desired, the dielectric writing medium need not be erased, but the image can be developed and kept or may be transferred to another dielectric writing medium which is charged to remove the powder adhering to the tape loop, enabling it to be used again while the images are permanently stored on the second medium.

I claim:

1. A system for viewing images represented by video and sweep signals comprising an electrostatic printing tube, a transparent dielectric writing medium, means for moving said medium past the operative face of said electrostatic tube responsive to said sweep signals, means for applying said video and sweep signals to said tube to deposit an electrostatic charge pattern on said medium, means for rendering said charge pattern visible, means for illuminating said visible charge pattern for projection onto a screen, and means for erasing said visible charge pattern from said dielectric writing medium.

2. A system for viewing images represented by video and sweep signals comprising an electrostatic printing tube having an electron beam generating means, a control grid for controlling the intensity of the beam from said beam-generating means in response to said video signals, a target including a plurality of separately spaced wires with their ends extending in a column outside of said tube, and means for deflecting the beam from said beam-generating means across said plurality of wires in response to said sweep signals, a ground plane positioned opposite said column of wire ends, a loop of a transparent dielectric writing medium, means for moving said medium responsive to said sweep signals past said tube between said ground plane and said column of wires to receive electrostatic charges in a pattern representative of said video and sweep signals, means for rendering said electrostatic pattern visible, means for illuminating said visible pattern for projection onto a screen, and means for erasing said visible pattern to render said dielectric writing medium usable again for being written on by said electrostatic printing tube.

3. A system for viewing in color images represented by video and sweep signals for each basic color aspect comprising for each basic color aspect an electrotrostatic printing tube, a transparent dielectric writing medium, means for moving said medium past the operative face of said electrostatic writing tube responsive to said sweep signals, means for applying video and sweep signals for the associated basic color aspect to said tube, to deposit an electrostatic charge pattern on said medium, means for rendering said charge pattern visible, means for illuminating each visible charge pattern with illumination having the corresponding basic color, means for projecting said illuminated visible charge patterns superimposed on a screen, and means for subsequently erasing said visible charge patterns from said dielectric writing medium.

References Cited in the file of this patent

UNITED STATES PATENTS

| | | |
|---|---|---|
| 2,072,527 | Nicolson | Mar. 2, 1937 |
| 2,277,013 | Carlson | Mar. 17, 1942 |
| 2,291,476 | Kemkamp | July 28, 1942 |
| 2,353,631 | Bliss | July 18, 1944 |
| 2,473,729 | Salz | June 21, 1949 |
| 2,573,881 | Walkup | Nov. 6, 1951 |
| 2,607,845 | Clark | Aug. 19, 1952 |
| 2,657,377 | Gray | Oct. 27, 1953 |
| 2,698,928 | Pulvari | Jan. 4, 1955 |
| 2,736,770 | McNaney | Feb. 28, 1956 |
| 2,771,336 | MacGriff | Nov. 20, 1956 |
| 2,777,745 | McNaney | Jan. 15, 1957 |